(12) United States Patent
Sambhy et al.

(10) Patent No.: US 12,528,972 B2
(45) Date of Patent: Jan. 20, 2026

(54) WATER-ROBUSTNESS OF INKJET PRINTS USING PAPER PRECOAT AND METHODS THEREOF

(71) Applicant: XEROX CORPORATION, Norwalk, CT (US)

(72) Inventors: Varun Sambhy, Pittsford, NY (US); Eliud Robles Flores, Rochester, NY (US); Guo-Yau Lin, The Woodlands, TX (US); Santokh S. Badesha, Pittsford, NY (US)

(73) Assignee: XEROX CORPORATION, Norwalk, CT (US)

(*) Notice: Subject to any disclaimer, the term of this patent is extended or adjusted under 35 U.S.C. 154(b) by 176 days.

(21) Appl. No.: 18/488,556

(22) Filed: Oct. 17, 2023

(65) Prior Publication Data
US 2025/0122405 A1 Apr. 17, 2025

(51) Int. Cl.
*B41J 11/00* (2006.01)
*B41M 5/00* (2006.01)
*B41M 7/00* (2006.01)
*C08L 83/04* (2006.01)
*C09D 11/102* (2014.01)
(Continued)

(52) U.S. Cl.
CPC ......... *C09D 183/04* (2013.01); *B41M 5/0017* (2013.01); *B41M 7/0018* (2013.01); *B41M 7/009* (2013.01); *C08L 83/04* (2013.01); *C09D 11/102* (2013.01); *C09D 11/38* (2013.01); *C09D 11/40* (2013.01); *C09D 11/54* (2013.01); *B41J 11/0015* (2013.01); *C09D 11/52* (2013.01)

(58) Field of Classification Search
CPC .... C09D 183/04; C09D 11/102; C09D 11/54; C09D 11/38; C09D 11/40; C09D 11/52; B41M 7/0018; B41M 5/0017; B41M 7/009; C08L 83/04; B41J 11/0015
See application file for complete search history.

(56) References Cited

U.S. PATENT DOCUMENTS 9,403,383 B1    8/2016 Liu et al.
2013/0176369 A1*  7/2013 Gotou .................. B41M 5/0023
                                                                  347/100
(Continued)

OTHER PUBLICATIONS

Extended European Search Report for related European Application No. 24202994.0 dated Mar. 17, 2025, 12 pages.
(Continued)

*Primary Examiner* — Yaovi M Ameh
(74) *Attorney, Agent, or Firm* — MH2 Technology Law Group LLP

(57) ABSTRACT

A system for improving water fastness of printed documents is described, including a paper transport configured to move paper along a path throughout the system for improving water fastness, a precoat application subsystem located along the path of the paper transport may include a precoat composition applicator adjacent to or in contact with the paper transport, a printhead configured to eject ink onto a surface of the paper in an imagewise fashion, and a dryer. A method for improving water fastness of printed documents and a water fastness precoat composition for printed documents is also described, including a non-functional silicone fluid, a functional silicone fluid, or a combination thereof.

18 Claims, 2 Drawing Sheets

(51) Int. Cl.
*C09D 11/38* (2014.01)
*C09D 11/40* (2014.01)
*C09D 11/54* (2014.01)
*C09D 183/04* (2006.01)
*C09D 11/52* (2014.01)

(56) References Cited

U.S. PATENT DOCUMENTS

| | | | |
|---|---|---|---|
| 2016/0303881 A1* | 10/2016 | Aoyama | B41M 5/0017 |
| 2019/0317438 A1* | 10/2019 | Sambhy | G03G 15/2025 |
| 2021/0047527 A1 | 2/2021 | Iihara et al. | |
| 2022/0403594 A1 | 12/2022 | Hirade et al. | |
| 2023/0044967 A1 | 2/2023 | Niizuma et al. | |
| 2023/0323148 A1 | 10/2023 | Hioki | |

OTHER PUBLICATIONS

"CONTIWEB Remoistening product brochure," downloaded on Oct. 11, 2023 from https://www.contiweb.com/web/inkjet/remoistening, 10 pages.

* cited by examiner

WATER-ROBUSTNESS OF INKJET PRINTS USING PAPER PRECOAT AND METHODS THEREOF

TECHNICAL FIELD

The present teachings relate generally to a system and method for precoating paper and, more particularly, to inkjet prints using a precoated paper.

BACKGROUND

Digital acoustic ink jet (AIJ) printing is an area of strategic growth for several production class printing systems. Printers or consumers of printed materials making or considering a transition from a dry powder (electrophotographic) printing system to an acoustic ink jet printing system or printing press require the maintenance of existing image quality (IQ) and print permanence and durability characteristics while reducing run cost per kiloprint (kp). Exemplary printing systems using the acoustic ink jet printing methods have significantly improved print image quality matching or exceeding current electrophotographic printing methods.

However, one of the disadvantages of AIJ prints versus electrophotographic prints is image durability related to water fastness. Since AIJ ink is water-based, prints are not as durable to water exposure as toner or dry powder prints. This can be especially true for uncoated media or paper, where there is no barrier coating on paper. Approximately 80% of the media usage field on production AIJ printing systems uses uncoated paper or media.

Therefore, it is desirable to develop or design methods or systems to improve water fastness of AIJ prints on uncoated media, which could be a valuable product feature or add-on that opens new opportunities and use of aqueous based ink jet printing systems.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A system for improving water fastness of printed documents is disclosed. The system includes a paper transport configured to move paper along a path throughout the system for improving water fastness, a precoat application subsystem located along the path of the paper transport may include a precoat composition applicator adjacent to or in contact with the paper transport, a printhead configured to eject ink onto a surface of the paper in an imagewise fashion, and a dryer. Implementations of the system for improving water fastness of printed documents can include where the precoat application subsystem may include one or more rollers positionable to contact a surface of the paper. The precoat application subsystem may include a liquid ejector positionable to eject droplets onto a surface of the paper in an imagewise fashion. The system for improving water fastness of printed documents may include a precoat composition including a silicone fluid. The precoat composition further may include a non-functional silicone fluid or an amine functional silicone fluid. The precoat composition may include a pendant propyl amine, terminal propyl amine, or a combination thereof. The precoat composition further may include a propyl mercapto functional silicone or a fluoro-functional silicone. The precoat composition, also referred to as a pre-treatment composition herein, further may have a viscosity of from about 10 cp to about 5000 cp, when measured at 25° C. The precoat application subsystem is external to the printhead and the dryer. The paper can be in the form of a continuous web or one or more discrete sheets.

A method for improving water fastness of printed documents is disclosed. The method for improving water fastness of printed documents includes applying a precoat composition to a surface of a paper, printing an image. which may include the use of a water-based ink onto the surface of the paper. The method for improving water fastness of printed documents also includes heating the surface of the paper, the precoat composition, and the water-based ink. Implementations of the method for improving water fastness of printed documents can include where the precoat composition is applied to the surface of the paper using a precoat application subsystem including one or more rollers positionable to contact a surface of the paper. The precoat composition applied to the surface of the paper is done using a precoat application subsystem which can include a liquid ejector positionable to eject droplets onto a surface of the paper in an imagewise fashion. The method for improving water fastness of printed documents may include pausing for up to 24 hours between the precoat composition to the surface of the paper and printing the image using the water-based ink onto the surface of the paper. The precoat composition may include an amine functional silicone fluid or a non-functional silicone fluid.

A water fastness precoat composition for printed documents includes a non-functional silicone fluid. The composition can include a functional silicone fluid where the functional silicone fluid is present in the water fastness precoat composition in an amount of from about 1 wt % to about 30 wt % based on a total weight of the water fastness precoat composition, and the non-functional silicone fluid is present in the water fastness precoat composition in an amount of from about 50 wt % to about 99 wt % based on a total weight of the water fastness precoat composition.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1:
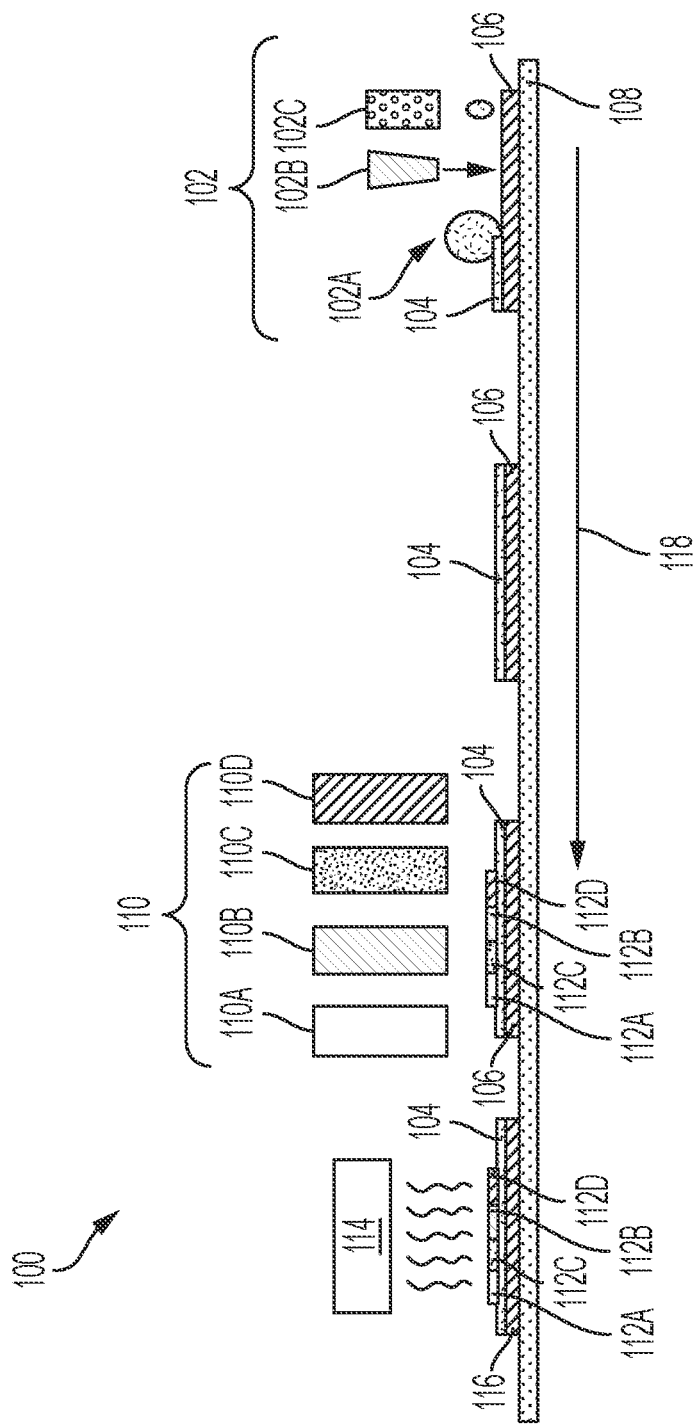
FIG. 1 is a schematic diagram of a system and method for pre-coating paper prior to ink jet printing, in accordance with the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

The present disclosure provides an inline paper precoat process using silicone based fluids that improves water fastness of prints on uncoated paper, after being printed with water or aqueous-based inks. Precoat or pre-treatment compositions including silicone fluid, in accordance with the present disclosure, applied as a precoat inline using a roll system or spray system coat the paper fibers on a surface of the paper, and as paper is uncoated the precoat composition penetrates into the paper fibers. As silicone fluid, sometimes referred to as silicone oil, is hydrophobic and improves the water repellency of the prints, this provides a result of making the printed paper more durable to water exposure. Silicone fluids are presently used in printing, most notably as fuser release fluids. These compositions are nontoxic, inexpensive, and can be chemically tailored to include useful functional groups, for example, amines, acids, thiols, hydride, and the like, and are well tolerated in existing paper recycling facilities that currently handle toner prints with oil on one or more surfaces of the paper. Various methods in application of a controllable metered quantity of precoat composition on paper, such as existing release agent management (RAM) systems including a donor roll, or an ejection method of precoat compositions or fluids can also allow selective digital placement or variable placement on a paper surface only where ink is jetted. Thus, the application of precoat compositions to one or more surfaces of a paper can be applied either intermittently or continuously. This intermittent or continuous application can be achieved either by the application of a precoat composition or by the nature of the media fed through the printing system. For example, in certain printing systems, the paper or printed media can be a continuous web of paper, or be made up of cut sheets, or discrete pieces of papers. In examples of the use of a RAM system, a fluid donor roll can be positionable between a fluid supply and a surface of the paper. In examples, a fluid donor roll can be engaged or moved to be partially submersed in a fluid or positioned to be in contact with a surface of paper, either simultaneously or moved in such a way where a donor roll is submersed in a fluid supply in one timeframe, then in contact with a surface of the paper. During some printing operations the timescale between a precoat step and a printing step can be relatively short, such as on the order of 10-1000 ms. In other examples, the timescale may be long, for example, when the precoat steps and system are separate from or not integrated with the printing steps and/or operation within a common machine or printing system. In other examples, post-print surface bonding or binding may be impacted with the use of some precoat compositions. These binding effects may be mitigated by drying or heating the ink with the precoat composition on the surface of the paper. The elevated temperature of the drying step can initiate a reaction between the precoat composition and the ink composition. While exact recipes and constituents of ink formulations can be variable, aqueous inks typically include water, cosolvents such as propylene glycol, hexanediol, butanediol, and glycerol, surfactants, pigments, biocides such as Proxel™, pH modifiers like triethanolamine, latex like styrene acrylate copolymers or emulsified polyurethane. Example ink components along with some typical composition amounts are shown in Table 1, below. Without being bound by any particular theory, it is posited that one or more components in the precoat compositions reacts with one or more of the components in the ink, resulting in a more robust image formed by the ink and precoat composition upon drying. For example, a functional silicone fluid component, such as an amine functionality may react and/or crosslink with the latex resin in the ink. In certain examples, an amine functional group of the silicone-based precoat composition could react with carboxylic acid (—COOH) functional groups in a latex component of an ink. Furthermore, amine groups in a precoat composition may additionally have non-covalent H-bonding interactions with ink pigment, ink latex and paper. While various latex or resin components can be utilized in ink formulation, the selection of precoat component may also be modified based on the ink composition used in the printing system to further enhance image durability and water fastness with the presently disclosed precoat compositions and methods.

| Role | Component | wt % |
|---|---|---|
| Latex/resin | For film forming and pigment dispersion | ~4 |
| Solvent | Water | 52-64 |
| Co-solvent, humectant | Propylene glycol | 17-32 |
| Co-solvent, penetrant | 1,2-Hexanediol | 5-16 |
| Stabilizer | Triethanolamine | 0.9 |
| Surfactant | Silane-PEO | 0.3-0.7 |
| Pigment | Carbon K, PY74, PB15:3, or PR122 + PR15 | 4-6 |
| Biocide | Proxel GXL | variable |
| Coalescing agent | Texanol + other | 0.6 |
| Other additives | Viscosity modifiers, stabilizer, defoamers, plasticizer, buffers | variable |

In other examples, the application of a precoat composition can be accomplished in an imagewise fashion, such as by selective ejection or spray application. In an exemplary example, a print head assembly or array, or a liquid ejector can be positionable, i.e. translate across a lateral dimension (from side to side) of a paper, or movable to be further away from or closer to a surface of a paper, or addressable to actuate only specific jets to eject small drops or droplets of precoat composition a onto a surface of the paper, in an imagewise fashion. In this context, imagewise fashion can be defined as applying a precoat formulation to approximate locations on a surface of the paper that correspond to locations on the paper where an ink ejector printhead will subsequently print an image on the same surface of the paper in a same approximate location. Each subsequent page, sheet, or section of a continuous paper web can have the same image printed upon a surface of the paper, and thus will have a precoat composition applied in the same or similar locations on a surface of the paper as the image or ink that is applied to the surface of the paper. In other examples, each subsequent page, sheet, or section of a continuous paper web can have a different or variable image printed upon a surface of the paper, and thus will have a precoat composition applied in the same or similar variable locations on a surface of the paper as the variable image or ink that is applied to the surface of the paper.

The present disclosure provides polymeric-based fluids or fluid blends including non-functional silicone fluids and amine-functional or other functional silicone fluids as water-fastness precoat compositions. These fluids alone, blends of one or more of these fluids, or base precoat compositions including these fluids, possibly containing other additives or adjuvants, and other examples, can be fabricated by simply mixing various fluids together using an overhead stirrer at room temperatures with or without additional carriers, solvents, or other materials. Various precoat compositions and their respective components including silicone fluids described herein would be completely miscible with one other. The chemical structures of some components of one or more exemplary silicone fluid components are shown below:

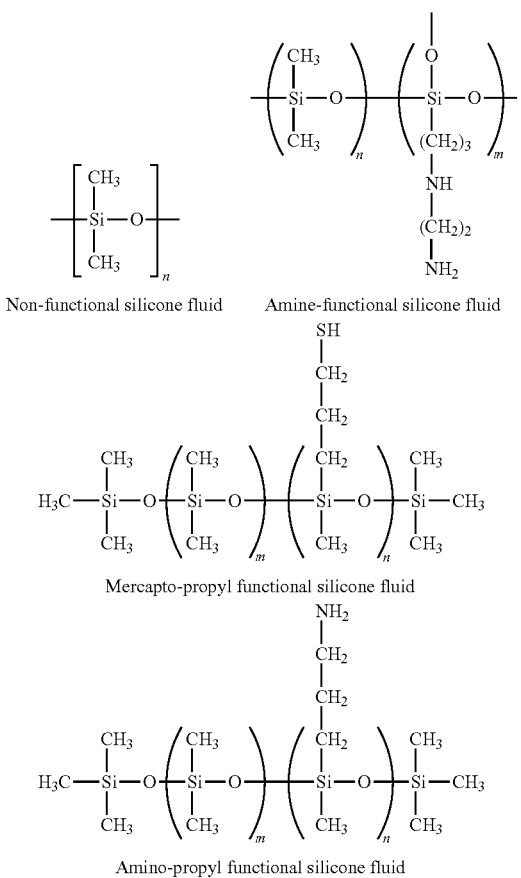

Non-functional silicone fluid

Amine-functional silicone fluid

Mercapto-propyl functional silicone fluid

Amino-propyl functional silicone fluid

As depicted above, non-functional silicone fluid may also be referred to as a non-fluorinated, non-functional silicone fluid. These non-functional silicone fluids may also be referred to by the abbreviation PDMS, for polydimethylsiloxane. Likewise, the functional silicone fluid may also be referred to as a non-fluorinated, functional silicone fluid. It should be understood by a person skilled in the art that a non-fluorinated non-functional silicone fluid does not contain any fluorine atoms in its chemical structure or composition, and a non-fluorinated functional silicone fluid does not contain any fluorine atoms in its chemical structure or composition. Some precoat compositions can include components that do contain fluorine-functional groups. In examples, the chemical functionalities mentioned herein may be pendant or terminal in terms of where the chemical functionalities are attached to the silicone or polydimethylsiloxane polymer chains.

Additional functional silicone fluids used in precoat compositions can include but are not limited to, silicone fluids having a functional group either containing or not containing any fluorine atoms, such as hydride-terminated or hydride-pendant functional silicone fluids, including dimethyl hydride, methyl hydride, or combinations thereof. Additional illustrative examples can include mercapto-terminated or mercapto-pendant functional silicone fluids, including functional groups such as (3-mercaptopropyl)trimethoxy-, (3-mercaptopropyl)triethoxy-, 11-mercaptoundecyltrimethoxy-, s-(octanoyl)mercaptopropyltriethoxy-, (mercaptomethyl)methyldiethoxy-, 3-mercaptopropylmethyldimethoxy-, mercaptopropyltrialkoxy-, such as mercaptopropyltrimethoxy-3-mercaptopropyltrimethoxy-, mercaptoundecyltrimethoxy-, (mercaptomethyl)methyldiethoxy-, or combinations thereof. Additional illustrative examples can include amine-terminated or amine-pendant functional silicone fluids. Amine functional groups can further include primary amines, secondary amines, tertiary amines, or combinations thereof.

Examples of amine-functional groups can include 3-aminopropyltrimethoxy-, 3-aminopropyltriethoxy-, 3-aminopropylmethyldimethoxy-, 3-aminopropylmethyldiethoxy-, 3-aminopropyldimethylethoxy-, 3-(2-aminoethylamino)propyltrimethoxy-, 3-(2-aminoethylamino)propyltriethoxy-, 3-(2-aminoethylamino)propyldimethoxymethyl-, 3-(2-aminoethylamino)propyldiethoxymethyl-, 3-[2-(2-aminoethylamino)ethylamino]propyltrimethoxy-, and 3-[2-(2-aminoethylamino)ethylamino]propyltriethoxy-, 3-3-aminopropyltris(2-(2-methoxyethoxy)ethoxy)-, 3-aminopropyltriisopropenyloxy-, 3-aminopropyltri(butanone oximo)-, 4-aminobutyltriethoxy-, N-2-(aminoethyl)-3-aminopropyltris(2-ethylhexoxy)-, 3-aminopropyldimethylethoxy-, 3-aminopropyldiisopropylethoxy-, p-aminophenyltrimethoxy-, m-aminophenyltrimethoxy-, 3-aminopropylphenyldiethoxy-, 3-aminopropyltriethoxy- and 3-aminopropyltrimethoxy-, or combinations thereof.

Additional examples of non-functional silicone fluids can include fluids having a repeat unit of $Si(CH_3)_2O-$, as depicted schematically herein, in either a linear or branched polymeric structure, with or without additional chemical functionality. The structure, properties, and behavior of branched silicones are known to those skilled in the art. The precoat compositions as described herein may contain additional surfactants or additives to improve performance, but are essentially water free, or contain only trace amounts of water.

FIG. 1 is a schematic diagram of a system and method for pre-coating paper prior to ink jet printing, in accordance with the present disclosure. A schematic for a system 100 for improving water fastness of printed documents is shown, which includes a precoat application subsystem 102 located along a path 118 of the paper 106 transport comprising a precoat composition applicator 102A, 102B, 102C adjacent to or in contact with the paper transport 108. The precoat application subsystem 102 is configured to apply a precoat composition 104 to a surface of paper 106 prior to the formation of an image on the paper 106 using an aqueous-based ink.

In one example shown, a donor roll of a RAM type precoat application subsystem 102A is shown, where a roller is in contact with the paper transport 108 and a paper 106 surface when the paper 106 moves in between the roller of the RAM type precoat application subsystem 102A and a precoat composition 104 is applied to a surface of the paper as it passes through the precoat application subsystem 102. In another example of a spray-type precoat application subsystem 102B is illustrated in proximity to a paper 106 surface when the paper 106 moves in between the spray-type precoat application subsystem 102B and the paper transport 108, and a precoat composition 104 is applied to a surface of the paper 106 as it passes through the precoat application subsystem 102. The spray-type precoat application subsystem 102B can be or include an aerosolization head for forming and projecting an aerosol version of the precoat composition 104 on to a surface of the paper 106 in aerosol or atomized form. Appropriate pressure settings, spray tip configuration, and temperature handling, as well as other attributes of this spray-type precoat application subsystem 102B would be known by one skilled in the art to be used in a manner consistent with applying a consistent or constant thickness of a precoat composition 104 onto the surface of the paper 106. In a third example, an ejector or jetting type precoat application subsystem 102C is shown for applying a precoat composition 104 to the surface of the paper 106 as it passes through the precoat application subsystem 102. A standard printhead assembly or array could be used in this example, where the precoat composition 104 can be applied continuously or only in an imagewise fashion.

In the system 100 for improving water fastness of printed documents, a paper transport moves the paper 106 along a path throughout the system 100. Further along the paper transport 108 is a printhead 110 that ejects one or more colors or types of ink onto a surface of the paper in an imagewise fashion. In the example shown in FIG. 1, there are four separate printheads 110A, 110B, 110C, 110D shown, each of which deposits or ejects a respective color ink 112A, 112B, 112C, 112D onto the paper 106, on top of the precoat composition 104 previously applied by the precoat application subsystem 102. After printing, the paper 106 is transported along the paper transport 108 to be in proximity to a dryer 114, wherein each color ink 112A, 112B, 112C, 112D on the paper 106 is dried or heated or conditioned to produce a water fast print 116. In examples, one color may be used, or up to 10 colors may be used. In other examples, more than one precoat composition 104 can be used. In examples, the paper path 118 may provide a paper 106 or section of paper to each station of the system 100 in succession, or alternatively, there may be a pause between stations. For example, paper 106 may have a precoat composition 104 applied and not have an image printed upon the pretreated paper for up to 24 hours. Furthermore, the precoat application subsystem 102 may be integrated within the same machine as the remaining portions of the system 100 as shown in FIG. 1, or it may be separate and external from the printing and drying operations of the system 100, and the precoat application subsystem 102 is external to the printhead 110 and the dryer 114.

In examples, the system for improving water fastness of printed documents can include where one or more donor rolls of a RAM type precoat application subsystem 102A precoat application subsystem are positionable to contact a surface of the paper. Exemplary examples of a system 100 for improving water fastness of printed documents can include where the precoat composition includes a silicone fluid, that can include a non-functional silicone fluid, a functional silicone fluid, such as an amine functional silicone fluid, or a combination thereof. In examples, the precoat composition can include a pendant propyl amine, terminal propyl amine, or a combination thereof as further described herein. Alternatively, the precoat composition includes a propyl mercapto functional silicone or a fluoro-functional silicone. Consistent with the capability of the precoat application subsystem 102 to be implemented in several formats or delivery types, the precoat composition can include a viscosity of from about 10 cP to about 5000 cP, as measured at 25° C. In examples, the paper 106 is in the form of a continuous web, or alternatively, the paper 106 is in the form of one or more discrete sheets or separately pre-cut sheets. In the example of the continuous web, the paper 106 can be cut or separated after printing.

Figure 2:
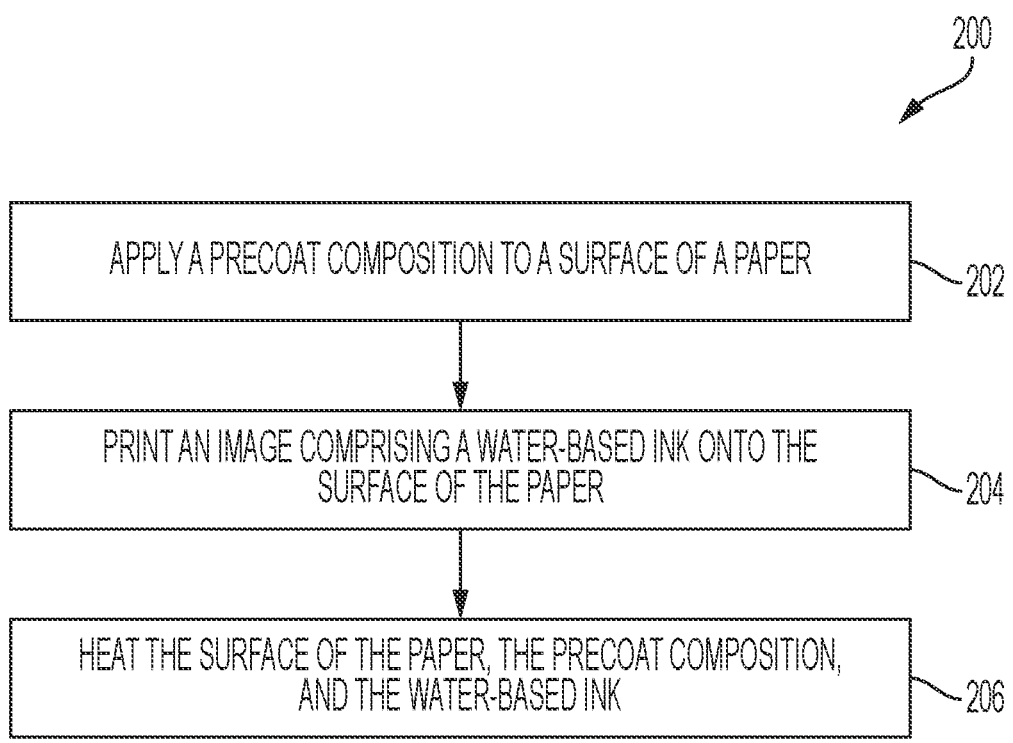
FIG. 2 is a flowchart illustrating a method for pre-coating paper prior to ink jet printing, in accordance with the present disclosure.

FIG. 2 is a flowchart illustrating a method for pre-coating paper prior to ink jet printing, in accordance with the present disclosure. The method for improving water fastness of printed documents 200, includes the steps of applying a precoat composition to a surface of a paper 202, printing an image comprising a water-based ink onto the surface of the paper 204, and heating the surface of the paper, the precoat composition, and the water-based ink 206. In examples, the step of heating the surface of the paper, the precoat composition, and the water-based ink 206 occurs after application of the precoat composition to a surface of a paper 202 and printing the image comprising a water-based ink onto the surface of the paper 204. In other examples, these steps might be conducted in different order or one or more of the steps can be repeated at any point in the method for enhanced water fastness and durability properties. The method for enhancing the water fastness of printed documents 200 includes implementations where the precoat composition is applied to the surface of the paper using a precoat application subsystem further comprising one or more rollers positionable to contact a surface of the paper. As noted previously, the precoat composition can be applied using or a liquid ejector, or a spraying or atomizing apparatus. It is also possible to wait for up to 24 hours between applying the precoat composition and printing the image. The precoat composition itself can consist of an amine functional silicone fluid, a non-functional silicone fluid, or other composition or combination of materials as described herein.

Key advantages of the present disclosure include the improvement of water fastness durability of uncoated stock prints. Uncoated stock is less expensive and accounts for ~80% media usage for comparable printers as the system described within. Silicone fluid design and delivery systems can be readily implemented into such printing systems, and the silicone fluids are inexpensive and nontoxic. While the compositions and methods of the present disclosure are mostly applicable to uncoated paper or media, these should be applicable to coated paper or media as well. Uncoated paper can be defined as paper manufactured without a surface coating. While the uncoated paper can be treated or manufactured for certain properties, a coated paper, known to one skilled in the art is typically manufactured with a sealant or coating to provide a less porous paper surface as compared to uncoated paper. Methods and compositions as described herein can work with coated paper as long as there is functional compatibility between the coating and the precoat treatment composition. In examples using uncoated paper, the precoat composition can remain on a top surface of the paper.

Experimental

Acoustic ink jet (AIJ) inks are water-based, in other words, include an aqueous component. It has been demonstrated that such inks can be printed on paper having the hydrophobic silicone fluids deposited thereupon. Furthermore, it has been shown that prints are stable and robust, with acceptable image quality (IQ). Testing was conducted on Lynxjet® uncoated paper, available from Domtar, Fort Mill, SC, USA. Lynxjet® sheets were passed through an iGen fuser to precoat silicone fluid on the paper. Next, both precoat or precoat composition coated and control, uncoated sheets were printed on an inkjet single dryer printer using customer like prints sets and setpoints.

Results demonstrated no significant difference between AIJ prints on silicone fluid/no silicone fluid precoated paper. Customer-like prints were evaluated by image quality experts for subjective review and it was verified our that prints look virtually identical, whether coated or not coated with a water fastness precoat composition, as shown in Table 2, below. Solid 100% area coverage (AC) ink patch optical density using Xrite spectrophotometer of coated and uncoated prints were similar as well. Image robustness was measure using Taber linear abrader using standard test protocols, including: 15 rubs @ 30 cycles/min followed by a measure O.D. and gloss before and after rub. Optical density (O.D) was measured using a X-rite Exact portable spectrophotometer. Gloss measurements were made using a BYK Gardner Micro-Tri Gloss Glossmeter. O.D and gloss measurements and meaning are well known to those skilled in the art, as it provides a numerical characterization or quantification of how dark and how glossy a print patch appears. In each measurement the respective meter is placed on the patch and measurement taken as per the equipment instructions. No significant difference between prints both having a precoat composition and without a precoat composition, showing prints on paper having release layer are robust, as shown in Table 3, below. Even one potential shortfall with a silicone fluid on a paper surface, where customers cannot bind the pages or write on them, post-it or tape doesn't stick to them is not exhibited when also printed using aqueous ink on top of a silicone fluid based precoat composition. In these evaluations, tape stuck very well to ink patch on top of paper having silicone fluid based precoat compositions.

Image Quality Analysis and Comparison

TABLE 2

IQ expert rating of prints, verified that prints with precoat composition and no precoat composition precoat appear almost identical

| 100% AC Ink Patch | With Precoat Composition | No Precoat Composition |
| --- | --- | --- |
| K Density | 0.962 | 0.984 |
| C Density | 0.910 | 0.914 |
| M Density | 0.818 | 0.838 |
| Y Density | 0.862 | 0.874 |

TABLE 3

Tested Black 100% area coverage (AC) Solid patch for Image Robustness using standardized Taber linear abrader test protocol

| | 75° Gloss Initial | 75° Gloss After 15 Rubs | O.D. Initial | O.D. After 15 Rubs |
| --- | --- | --- | --- | --- |
| With Precoat Composition | 5.0 | 5.4 | 0.962 | 0.977 |
| No Precoat Composition | 5.1 | 6.0 | 0.984 | 0.990 |

Water Fastness Bench Testing includes the procedure of applying water using foam brush to a black band (100% solid area) on a printed image. After a 1-minute wait time, the band is rubbed five times with a common cleanroom lint-free cloth wipe. It is demonstrated that silicone fluid containing precoat compositions significantly improves the water fastness of prints.

Examples of Precoat Compositions

Silicone fluid blends were made by mixing non-functional fluid (AK300, from Wacker Silicones) and amine-functional fluid (Copy Aid, denoted as CA-200 or CA-270), from Wacker Silicones) in various weight ratios, blended together in a vessel using an overhead stirrer. The Copy Aid series of fluids include pendant N-(2-aminoethyl)-3-aminopropylamine functional polydimethylsiloxane with viscosity in range of 10-10000 cP (as measured at 25° C.), based on the grade or molecular weight of the fluid used.

In the above chemical structures for the non-functional and amine-functional fluids, these silicone fluids have a structure where n=100-10000, m=1 to 1000 and the resulting viscosity of the individual fluids or the blended fluids is from 10 to 10,000 cP. Illustrative examples include n as an integer from 10 to 10000, and m as an integer from 1 to 1000, and viscosity is from about 10 to about 1000 cP. It should be noted that all viscosity values are reported as measured at room temperature, or at or near 25° C.

Exemplary blended fluids were made as shown in Table 3 below. For the silicone fluids mentioned in Table 4, the chemical compositions of the AKF290, non-functional silicone fluids based on polydimethylsiloxane (PDMS), and functional silicone fluids based on polydimethylsiloxane (PDMS) are depicted herein. Fluids designated CA-200 or CA-270 are amine-functional silicone fluids as described previously. It should be noted that in descriptions of viscosity, the units of centiStokes (cSt) are considered as equivalent to centipoise (cP) by those skilled in the art. It should be noted that all values of viscosity are determined at a temperature of from about 20° C. to 30° C., nominally 25° C.

The chemistry (functional group identity and mol %), molecular weight, viscosity, surface tension etc can all be optimized to get best deinking. For example, functional groups could be introduced in the release fluid that repel the pigment or paper fibers when exposed to deinking conditions. In the following examples, viscosities and other features are representative only, non-limiting, and ranges can fluctuate or be modified based on the starting blending materials, lot to lot variations, or other compositional attributes of a precoat composition.

TABLE 4

Precoat compositions are or include silicone fluids used within other printing technology areas.

| Fluid | Functional Type | Name | Viscosity |
| --- | --- | --- | --- |
| Fuser Agent 1076 | mercapto | Pendant propyl mercapto | 265 cSt (225-300) |
| Fuser Shield AKF275 | amino | Pendant propyl amine | 300 cSt (270-330) |

TABLE 4-continued

Precoat compositions are or include silicone fluids used within other printing technology areas.

| Fluid | Functional Type | Name | Viscosity |
| --- | --- | --- | --- |
| Fuser Agent II | | | 350 or 100 cSt |
| Fuser Fluid | | | 575 cSt |
| Fuser Fluid II | | | 575 cSt |
| Fuser Blend AKF260 | Amino-mercapto blend | Pendant propyl mercapto and Pendant propyl amine | 269 cSt |
| Copy Aid 200 (concentrate) | Diamino | Pendant N-(2-aminoethyl)-3-aminopropyl | 410-860 cSt |
| SLM-50330/AKF290 | Fluoro | Pendant tridecafluoro-octyl | 210 cSt |
| SLM-443401, ER-47042, ER-47043, or EF27110 | α,ω - amino | Terminal propylamine | 200-350 cSt |

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A system for improving water fastness of printed documents, comprising:
 a paper transport configured to move paper along a path throughout the system for improving water fastness;
 a precoat application subsystem located along the path of the paper transport comprising a precoat composition applicator adjacent to or in contact with the paper transport;
 a printhead configured to eject ink onto a surface of the paper in an imagewise fashion; and
 a dryer; and wherein:
 the precoat composition comprises a functional silicone fluid, comprising a propyl mercapto functionality.

2. The system for improving water fastness of printed documents of claim 1, wherein the precoat application subsystem further comprises one or more rollers positionable to contact a surface of the paper.

3. The system for improving water fastness of printed documents of claim 1, wherein the precoat application subsystem comprises a liquid ejector positionable to eject droplets onto a surface of the paper in an imagewise fashion.

4. The system for improving water fastness of printed documents of claim 1, wherein the precoat composition further comprises a non-functional silicone fluid.

5. The system for improving water fastness of printed documents of claim 1, wherein the precoat composition further comprises a terminal propyl amine, or a combination thereof.

6. The system for improving water fastness of printed documents of claim 1, wherein the precoat composition further comprises a aminopropyl- or fluoro-functional silicone.

7. The system for improving water fastness of printed documents of claim 1, wherein the precoat composition comprises a fluoro-functional silicone.

8. The system for improving water fastness of printed documents of claim 1, wherein the precoat composition further comprises a viscosity of from about 10 cP to about 5000 cP, when measured at 25° C.

9. The system for improving water fastness of printed documents of claim 1, wherein the precoat application subsystem is external to the printhead and the dryer.

10. The system for improving water fastness of printed documents of claim 1, wherein the paper is in the form of a continuous web.

11. The system for improving water fastness of printed documents of claim 1, wherein the paper is in the form of one or more discrete sheets.

12. A method for improving water fastness of printed documents, comprising:
applying a precoat composition to a surface of a paper;
printing an image comprising a water-based ink onto the surface of the paper; and
heating the surface of the paper, the precoat composition, and the water-based ink; and wherein:
the precoat composition comprises a functional silicone fluid, comprising a propyl mercapto functionality.

13. The method for improving water fastness of printed documents of claim 12, wherein the precoat composition is applied to the surface of the paper using a precoat application subsystem further comprising one or more rollers positionable to contact a surface of the paper.

14. The method for improving water fastness of printed documents of claim 12, wherein the precoat composition is applied to the surface of the paper using a precoat application subsystem comprising a liquid ejector positionable to eject droplets onto a surface of the paper in an imagewise fashion.

15. The method for improving water fastness of printed documents of claim 12, further comprising pausing for up to 24 hours between the precoat composition to the surface of the paper and printing the image comprising the water-based ink onto the surface of the paper.

16. The method for improving water fastness of printed documents of claim 12, wherein the precoat composition further comprises an amine functional silicone fluid.

17. The method for improving water fastness of printed documents of claim 12, wherein the precoat composition further comprises a non-functional silicone fluid.

18. A water fastness precoat composition for printed documents, comprising:
a non-functional silicone fluid; and
a functional silicone fluid, comprising a propyl mercapto functionality; and wherein
the functional silicone fluid is present in the water fastness precoat composition in an amount of from about 1 wt % to about 30 wt % based on a total weight of the water fastness precoat composition; and
the non-functional silicone fluid is present in the water fastness precoat composition in an amount of from about 50 wt % to about 99 wt % based on a total weight of the water fastness precoat composition.

\* \* \* \* \*